United States Patent [19]

Sagstetter et al.

[11] Patent Number: 4,973,101
[45] Date of Patent: Nov. 27, 1990

[54] ADD-ON COLLAPSIBLE SHELTER FOR USE ON A MOTOR VEHICLE

[76] Inventors: William E. Sagstetter, 2217 Grove St., Denver, Colo. 80211; Stephen L. Kishel, 517 Rambler Rd., Muncie, Ind. 47304

[21] Appl. No.: 503,120

[22] Filed: Mar. 30, 1990

Related U.S. Application Data

[63] Continuation of Ser. No. 306,801, Feb. 6, 1989, abandoned.

[51] Int. Cl.⁵ .............................................. B60J 7/08
[52] U.S. Cl. .................................... 296/160; 296/174; 5/118
[58] Field of Search .............. 296/156, 160, 164, 165, 296/174, 176; 5/118

[56] References Cited

U.S. PATENT DOCUMENTS

| | | | |
|---|---|---|---|
| 3,160,435 | 12/1964 | Smith | 296/176 |
| 4,101,159 | 7/1978 | Stewart | 296/214 X |
| 4,130,966 | 12/1978 | Kujawa, Jr. et al. | 296/218 X |
| 4,362,258 | 12/1982 | French | 296/160 X |

FOREIGN PATENT DOCUMENTS

| | | | |
|---|---|---|---|
| 139591 | 5/1985 | European Pat. Off. | 296/165 |
| 3046211 | 7/1982 | Fed. Rep. of Germany | 296/156 |
| 2554062 | 5/1985 | France | 296/165 |
| 2105266 | 3/1983 | United Kingdom | 296/156 |

*Primary Examiner*—Margaret A. Focarino
*Assistant Examiner*—Gary C. Hoge

[57] ABSTRACT

An add-on collapsible sleeping shelter which is mounted on a motor vehicle. The shelter consists of a hinged shell and a mating seal ring which is bolted to the vehicle roof. Integral to this shelter is a hinged bed-board which when raised angularly provides additional headroom and in the lower position provides ingress to and egress from a ready made bed with all bedding material intact. The underside of said bed-board provides a ceiling for the inside of motor vehicle. Flexible canvas-like wall material is attached to the shell and to the seal ring and unfolds to an enclosing position as the shell angularly moves upward to its extended position. Lifting devices, hinges, tension latches, and a molded trim ring are provided to conceal mounting hardware and exposed edge of vehicle roof.

8 Claims, 5 Drawing Sheets

4,973,101

ADD-ON COLLAPSIBLE SHELTER FOR USE ON A MOTOR VEHICLE

This application is a continuation of Ser. No. 306,801 filed on Feb. 6, 1989, now abandoned.

BACKGROUND OF THE INVENTION

This invention relates to an add-on collapsible sleeping shelter on a motor vehicle with a long roof. Numerous types of add-on shelters have been manufactured for motor vehicles over the years. The type that has achieved market acceptance have been those permanently affixed to the motor vehicle, but provide only additional headroom such as Young, U.S. Pat. No. 4,317,590. The add-on shelters that mechanically extend upward and provide sleeping accommodations such as Myers, U.S. Pat. No. 4,653,800, are subject to numerous drawbacks, such as complex mechanical lifting apparatus and time consuming assembly of the bed support, mattress and bedding.

Our invention incorporates several advantages including both headroom and sleeping accommodations by means of a hinged bed-board. The present invention permits the user to swing the entire hinged bed-board angularly upward out of its horizontal position, thereby providing increased open space within the collapsible sleeping shelter and inside the motor vehicle. In addition, relocating the hinged bed-board into the horizontal position within the collapsible sleeping shelter provides ingress to and egress from the bed-board. Because of its uniqueness our invention has provided these advantages in a safe manner with instant operation and immediate use of the made up bed. Further objects and advantages of our invention will become apparent from a consideration of the drawings and ensuing description there in.

DRAWING REFERENCE NUMERALS

Figure 1:
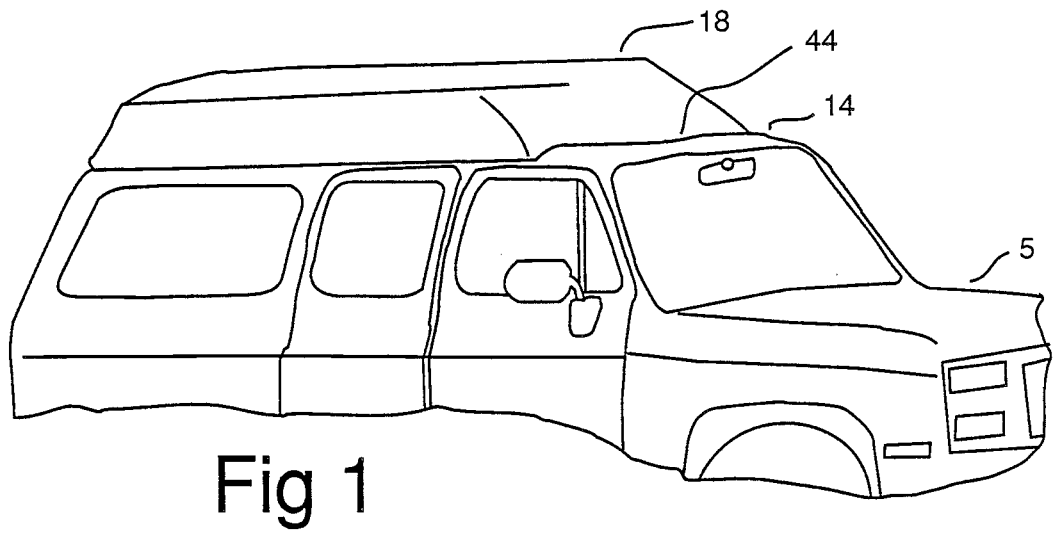
FIG. 1 shows a perspective view of a motor vehicle with a long roof and our invention in the closed or retracted position.

5: motor vehicle
10: collapsible sleeping shelter
14: motor vehicle roof
16: flexible canvas-like material
18: shell
20: seal ring
22: tongue for mounting 18 to 34
30: window screen
32: vertical boss of 34
34: shell hinge
36: cushioning pad for 34
38: hinge pins for 40 and 48
40: half hinge for 20
42: bulb seal for 20
44: bulb seal for 18
46: attachment point for 16 to 20
47: attachment point for 16 to 18
48: half hinge for 76
50: ball stud for 56
53: securing fastener for 20
56: lifting device, such as gas spring, for 18
57: lifting device, such as gas spring, for 76
64: fasteners for 34 and 22
66: trim ring
68: edge guard
70: fastener for 66
72: fasteners for 34, 20, and 40
74: threaded insert for down turned lip of 20
76: bed-board
78: fasteners for attaching 48 to 76
80: base flange of 20
90: space between front end of bed 92 and front end 95 of seal ring
92: front end of bed
95: front end of seal ring
100: moving bed from angular position 101 to horizontal position 105
101: angular position of bed board
102: moving bed from horizontal position 105 to angular position 101.
105: horizontal position of bed board
110: inside of motor vehicle
150: depending shroud
152: leading edge of seal ring
154: underside of roof panel of shell
156: circumferential wall of seal ring
158: lowest portion of canvas-like material
160: ball studs
162: down-turned lip of base flange
166: upper edge of trim ring
168: horizontal flange of trim ring

DESCRIPTION OF INVENTION

Figure 2:
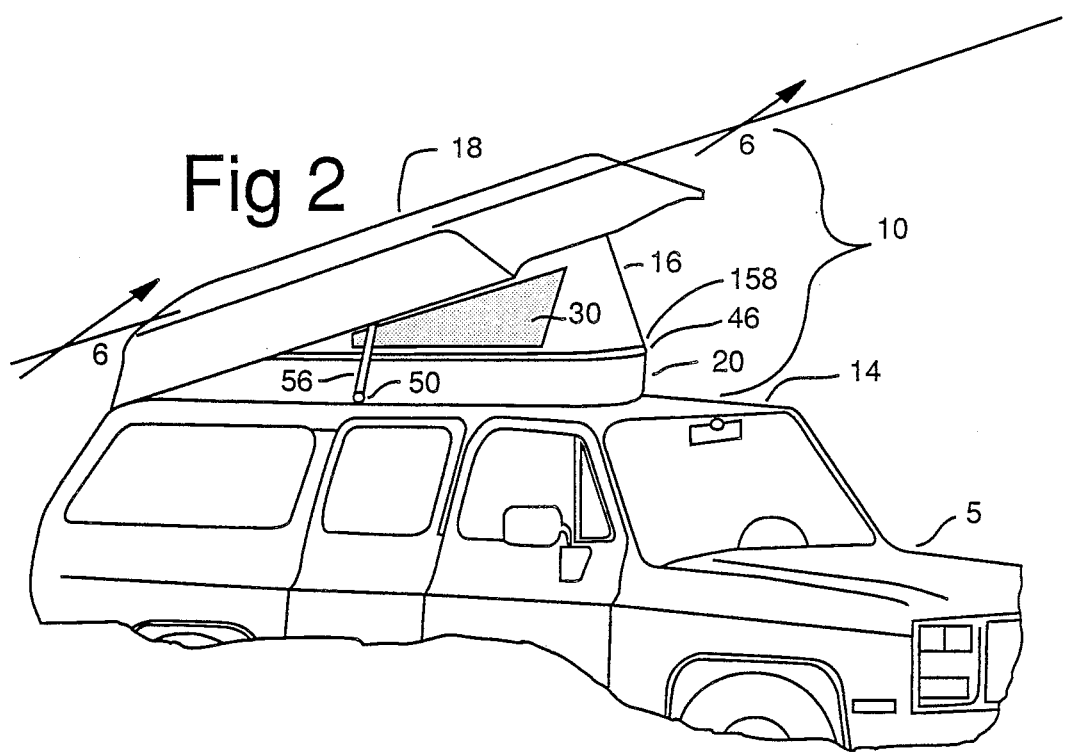
FIG. 2 shows a perspective view illustrating the shell in its open or extended position showing canvas, seal ring, and lifting device.
Figure 3:
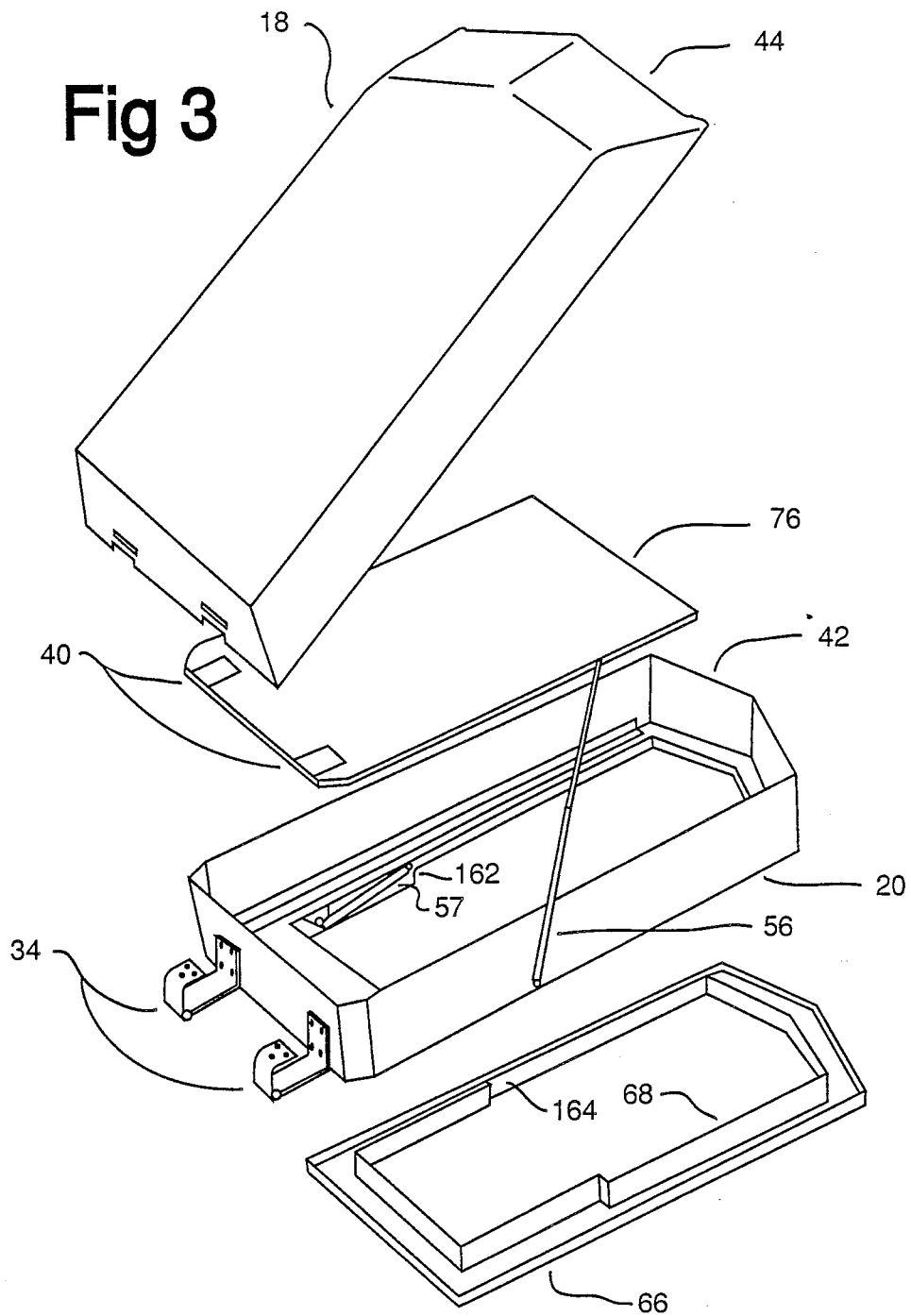
FIG. 3 shows an exploded view containing shell, bed-board, seal ring and trim ring.
Figure 4:
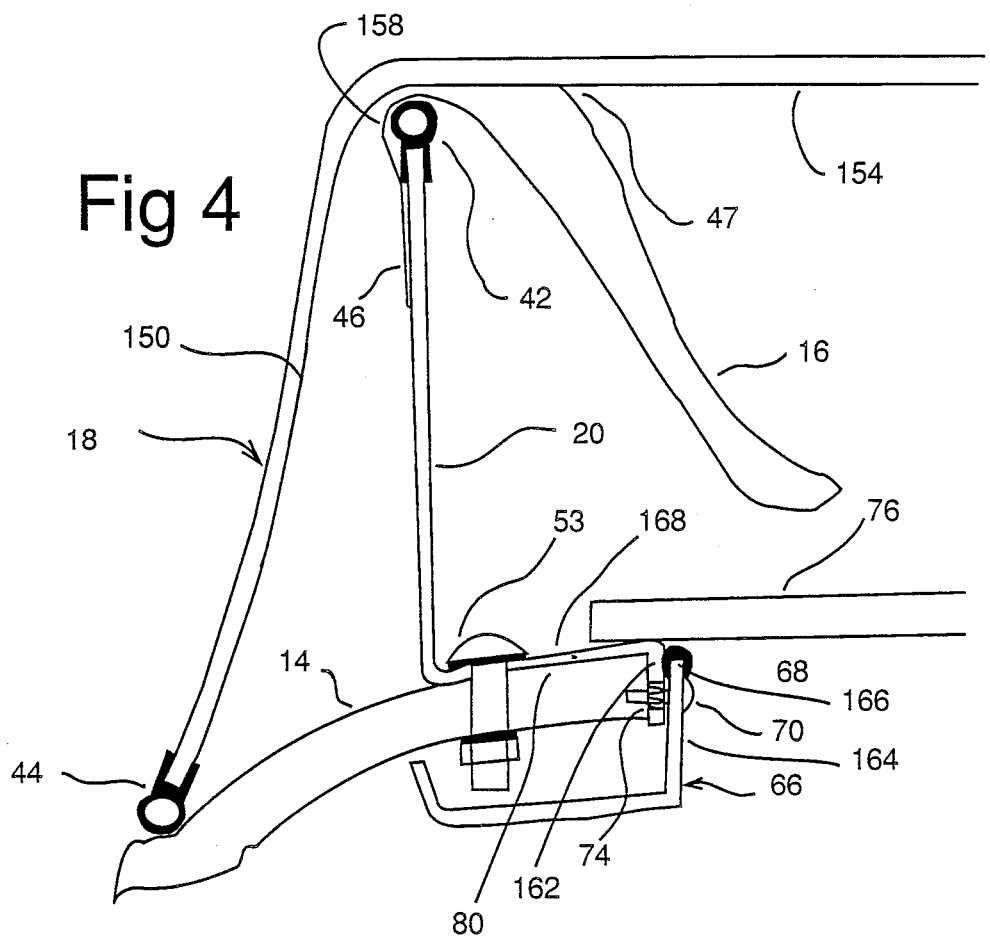
FIG. 4 shows a cross sectional view along lines 4—4 in FIG. 3 in the closed position, illustrating the shell, seal ring, bed-board, trim ring, and securing of seal ring to vehicle roof.
Figure 5:
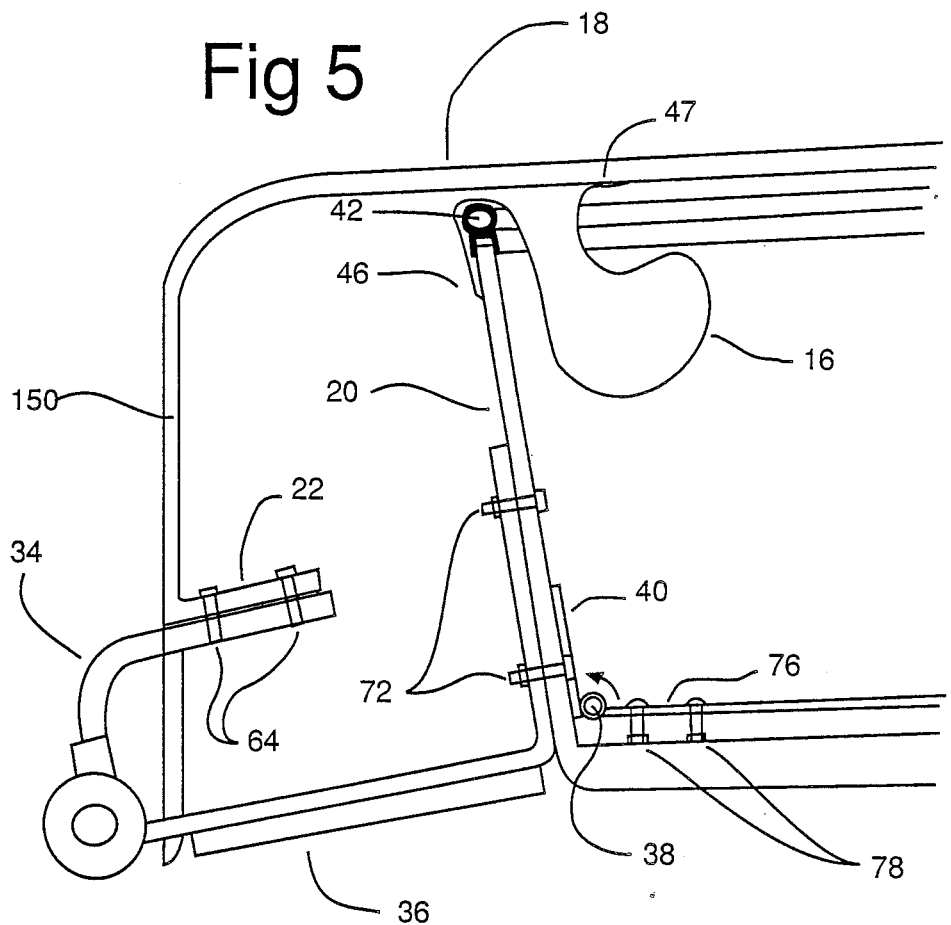
FIG. 5 shows an enlarged longitudinal view taken along line 6—6 in FIG. 2 illustrating hinging means for attaching shell to seal ring and hinging means for attaching bed-board to seal ring.

Referring to the drawings, an add-on collapsible sleeping shelter 10 for use on a motor vehicle 5 is illustrated in FIGS. 1 and 2. FIG. 4 shows a shell 18 in the closed position. The shell 18 has a depending shroud 150 that extends to the roof 14 of the vehicle 5. At the outer most portion of the shroud is a bulb seal 44 which is the primary seal against weather. Seal ring 20 has a circumferential wall 156 which also has a bulb seal 42 on its leading edge 152. The leading edge 152 extends to the underside of the roof panel 154 of the shell 18 thus forming a secondary seal against weather. A flexible canvas-like material 16 completely encloses the sleeping shelter when unfolded. The material 16 extends from the shell 18 at attachment point 47 to seal ring 20 continuously following the circumferential wall 156 of the seal ring 20. The canvas-like material 16 incorporates one screened in area 30 on each side, as shown in FIG. 2, which provides cross ventilation. At the lower most portion 158 of the canvas-like material 16 is a fastening edge 46, which secures the material 16 to the circumferential wall 156 of the seal ring 20. Lifting device 56 assists the lifting of the shell 18 to its fully extended position so that the shelter can be used as a bed or headroom. The lifting device 56 is attached to the shell's depending shroud 150 and the circumferential wall 156 of the seal ring 20 by means of ball studs 50. The shell 18 is hinged 34 by means of a tongue 22 that is attached to the shell 18. Tongue attachment to hinge 34 is accomplished by threaded fasteners 64. Shell hinge 34 has a leg known as a vertical boss 32, by means of which it attaches to the outside of the circumferential wall 156 of the seal ring 20 with fasteners 72. The shell hinge 34 has a portion called the cushioning pad 36, by which the motor vehicle's roof 14 is protected from damage due to wear from vibration. A fastener 72 shown in FIG. 5 provides attachment of half hinge 40. Half hinge 40 mates with half hinge 48 by means of a removable hinge pin 38, which further provides ease of installation of bed board 76. Fasteners 78 are used to attach the half hinge 48 to the bed board 76 in FIG. 5. In FIG. 5 the usefulness of the half hinges 40 and 48 when mated by means of hinge pin 38 becomes apparent, whereby bed board 76 can hinge upward into extended shell 18 for additional bedroom. Bolt 53 secures add-on collapsible sleeping shelter to the motor vehicle roof 14. The lifting device 57 for the hinged bed board 76 attaches by means of ball studs 160 (FIG. 6) to the down-turned lip 162 of base flange 80 and to the bed board 76. By means of lifting device 57 the bed board will stay supported in the extended position with the entire bed-board situated in an angular upward location inside the collapsible sleeping shelter. FIG. 4 illustrates trim ring 66 has a vertical flange 164 that overlaps and hides the down-turned lip 162 of the base flange 80. The trim ring's upper most edge 166 is finished off with an edge guard 68. The trim ring also has a horizontal flange 168, as seen in FIG. 4, by means of which the securing fasteners 53 are hidden from view. The trim ring 66 is attached to the down turned lip 162 of the base flange 80 by a fastener 70 and a threaded insert 74 which is also shown in FIG. 4. Referring to FIG. 4 illustrates the storage space created by our invention between underside of roof panel 154 of shell 18 and bed board 76, whereby bedding material can be continuously stored while traveling.

Figure 6:
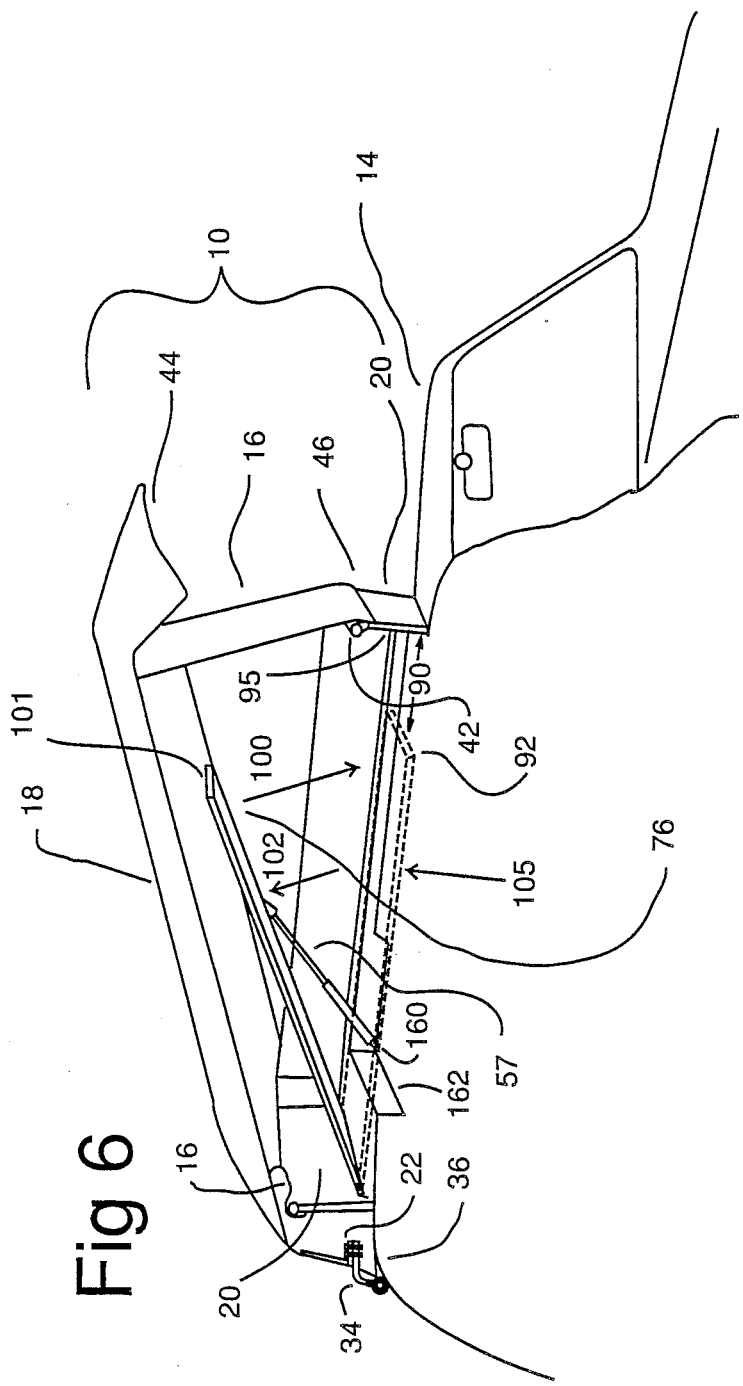
FIG. 6 shows a longitudinal view taken along line 6—6 of FIG. 2 illustrating shell in the extended position and the entire bed-board in the upward, angular position.

The preferred embodiment of our invention, as illustrated in FIGS. 4, 5, and 6, reveals the bed-board 76 hinged to the seal ring 20 which in turn is secured to vehicle roof 14. FIG. 6 illustrates that the front end 92 of the bed-board is not long enough to contact the front end 95 of seal ring. Thus, when the hinged bed-board 76 is pulled downward 100 and located in a horizontal position 105, as noted by dotted outline, there is open space 90 between the free end 92 of the bed board and front end 95 of the seal ring. This space 90 permits ingress to and egress from the bed-board 76 within the collapsible sleeping shelter 10 and inside 110 the vehicle. The entire bed-board 76 can be relocated into an angular position 101 (FIG. 6) by moving the hinged bed-board above the roof 14 of the motor vehicle. This provides additional open space within collapsible sleeping shelter 10 and inside 110 the motor vehicle.

The invention claimed is:

1. A collapsible sleeping shelter with a bed-board for a vehicle comprising:
   (a) a means to expand said collapsible sleeping shelter in preparation for use of said collapsible sleeping shelter;
   (b) a bed-board with pivoting means for relocating said bed-board from a horizontal to an angular position, thereby providing open space within said collapsible sleeping shelter and vehicle, and from said angular position to said horizontal position;
   (c) said collapsible sleeping shelter having gap means for providing ingress to and egress from said bed-board within said collapsible sleeping shelter and vehicle when said bed-board is in said horizontal position; and
   (d) a means (to) for retracting said collapsible sleeping shelter for storage of said collapsible sleeping shelter.

2. The collapsible sleeping shelter for use on a vehicle as set forth in claim 1 comprising:
   a preformed shell having a generally horizontal roof panel and a depending shroud around a periphery of said roof panel,
   a seal ring, having a circumferential wall and an inwardly turned base flange having a downward lip which protrudes through a precut opening in said vehicle, said lip covering the periphery of said opening,
   a bed-board resting inside of said circumferential wall on a top surface of said base flange, means for hingedly attaching said bed-board to said seal ring said bed-board being movable between a horizontal position above said roof and an angular position above said roof, said bed-board being movable between said angular position above said roof and said horizontal position above said roof,
   a flexible canvas-like material fastened to a bottom of said roof panel and to said circumferential wall,
   a trim ring having a vertical flange and a horizontal flange, said vertical flange fastened to said lip of said base flange, said horizontal flange extending away from said opening such that fasteners extending through said base flange securing said seal ring to said vehicle are hidden from view inside of said vehicle,
   means hingedly attaching an edge portion of said shell to said seal ring, said shell being movable from a horizontal position above the roof of said vehicle to an angular position above said seal ring,
   means hingedly attaching an edge portion of said shell to said seal ring, said shell being movable for retraction from said angular position to said horizontal position above said vehicle roof.

3. The bed-board as set forth in claim 1, said bed-board being movable from a horizontal position above said roof to an angular position above said roof, whereby in the horizontal position said bed-board provides a ceiling for said vehicle and a surface for a sleeping area above said vehicle, said bed-board in the horizontal position being shorter in length than length of said seal ring, such that space between front end of said bed-board and front end of said seal ring provides ingress in and egress from said bed-board inside said collapsible sleeping shelter and vehicle, said bed-board in the angular position above said roof providing extra headroom for occupants of said vehicle.

4. The collapsible sleeping shelter for use on a vehicle as set forth in claim 2 wherein said depending shroud is spaced outwardly of said circumferential wall sufficiently to receive said circumferential wall, said circumferential wall being of sufficient vertical dimension to engage said roof panel, said depending shroud being of sufficient vertical dimension to engage the roof of said vehicle outwardly of said opening when said shell is in its lowermost position, whereby a double seal against weather is formed.

5. The collapsible sleeping shelter for use on a vehicle as set forth in claim 2 wherein a rear edge of said depending shroud is hinged to rear of said seal ring on said circumferential wall, using hinges with an extending lower member on top of said vehicle roof, said lower member having a vertical boss positioned against the outside of said circumferential wall and fastened to said outside of said circumferential wall, an upper member of said hinges being fastened to a tongue protruding from inside a wall of said depending shroud, said tongue being parallel to portions of the upper and lower members of said hinges whereby said shell and said seal ring are hinged together without need for fastening said hinges to said roof.

6. The bed-board as set forth in claim 1, said bed-board in said horizontal position having gap space between said bed-board and inside of said collapsible sleeping shelter and vehicle which provides ingress and egress from said bed-board inside said collapsible sleeping shelter and vehicle.

7. An expanded collapsible sleeping shelter for a vehicle, comprising: a bed-board within said sleeping shelter, means for moving said bed-board from a first position to a second position and from said second position to said first position, gap means for providing ingress to and egress from said bed-board in said first position, said gap means being located between said bed-board and an inside of said collapsible sleeping shelter and vehicle, said bed-board in said second position providing open space within said expanded collapsible sleeping shelter and vehicle.

8. The bed-board set forth in claim 7 further comprising pivoting means for moving said bed-board from said first position which is in a horizontal plane to said second position which is in an angular plane and from said second position which is in said angular plane to said first position which is in said horizontal plane.

* * * * *